Aug. 25, 1959 D. F. MacNAUGHT ET AL 2,901,279
DOGGING MEANS

Original Filed March 2, 1955 2 Sheets-Sheet 1

INVENTORS
Donald F. MacNaught
and Robert A. Jacobson
BY R. S. A. Klougherty.
ATTORNEY Aug. 25, 1959   D. F. MacNAUGHT ET AL   2,901,279
DOGGING MEANS
Original Filed March 2, 1955   2 Sheets-Sheet 2
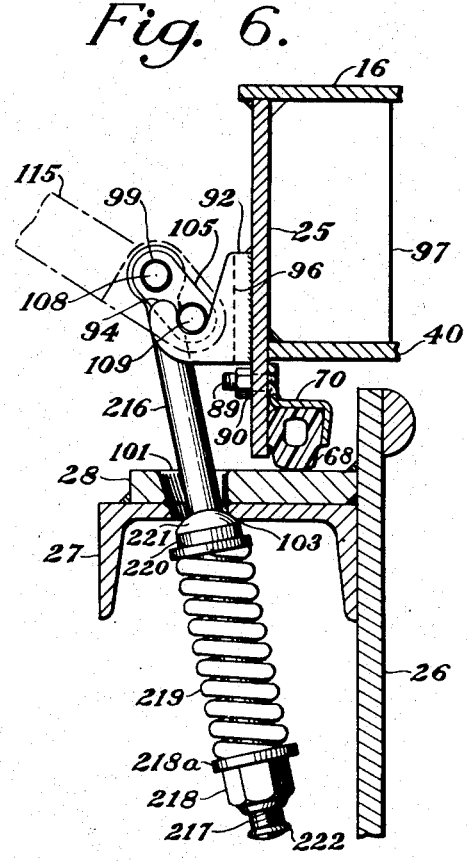
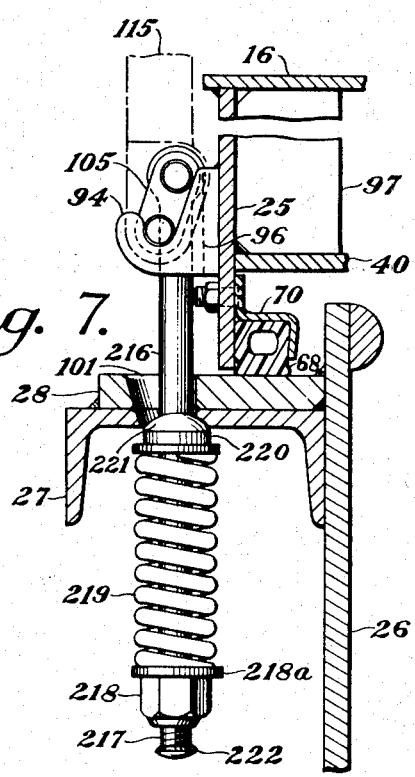
INVENTORS
Donald F. MacNaught
and Robert A. Jacobson
BY R. S. A. Klougherty.
ATTORNEY

United States Patent Office 2,901,279
Patented Aug. 25, 1959

2,901,279

DOGGING MEANS

Donald Frederick MacNaught, Hingham, and Robert Allan Jacobson, North Abington, Mass., assignors to Bethlehem Steel Company, a corporation of Pennsylvania Original application March 2, 1955, Serial No. 491,632. Divided and this application April 25, 1956, Serial No. 580,662

21 Claims. (Cl. 292—256.5)

This application is a division of our copending application, Serial No. 491,632, filed March 2, 1955, and relates to improvements in dogging means for a hatch cover.

Briefly, the invention which is the subject of this divisional application comprises a slotted flange secured to a hatch coaming, a dog bolt slidably mounted in said slotted flange, stopping means mounted to one end of the dog bolt in engageable relationship with the flange, a dog link rotatably mounted to the other end of the dog bolt, and spaced arms secured to the hatch cover and adapted to rotatably receive the dog link. We may also interpose resilient means such as a spring between the stopping means and the flange.

An object of our invention is to provide dogging means which can be rapidly operated so as to tightly seal the hatch opening, and which will allow breaking open of the closed hatch in the minimum of expended time.

Other objects and advantages of our invention will be apparent during the course of the following description.

In the accompanying drawings, in which like numerals represent like parts in the several views:

Fig. 6 represents a view in elevation of the modified dogging means, showing the dog link as it is brought over the arms of the dog pad.

Fig. 7 represents another view in elevation of the modified dogging means, showing the dog link locked in position against the arms of the dog pad, with the gasket compressed.

Figure 1:
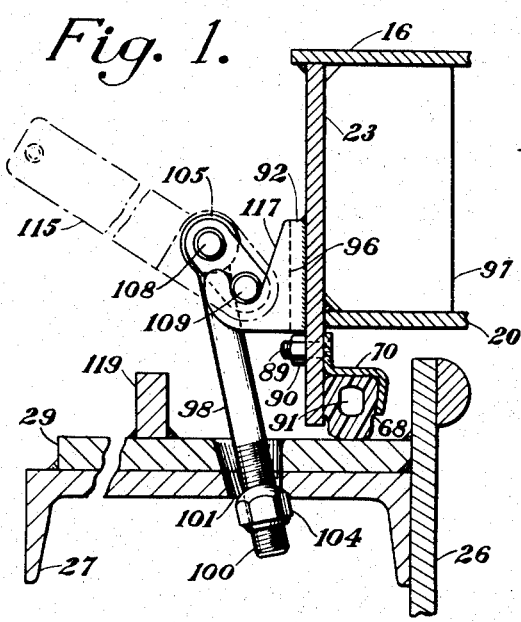
Fig. 1 represents a view in elevation of the dogging means, showing the dog link as it is brought over the arms of the dog pad.
Figure 2:
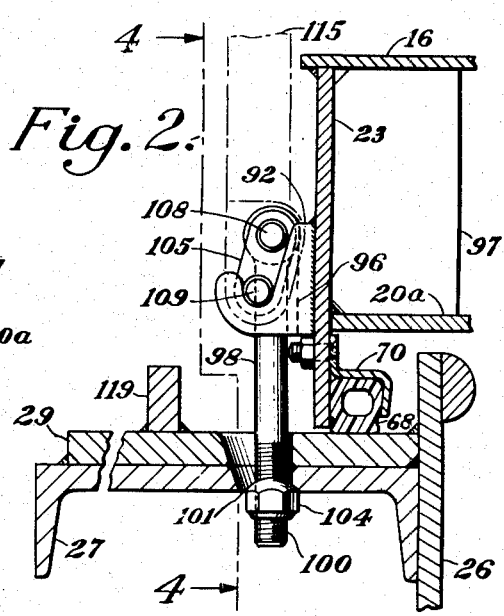
Fig. 2 represents another view in elevation of the dogging means, showing the dog link locked in position against the arms of the dog pad, with the gasket compressed.

We may employ our improved dogging means in conjunction with a hatch cover of more or less conventional structure, having, for instance, side plates 23, end plates 25, cover plates 16, flange plates 20a and 40, gasket retainer 70 secured to side plates 23 and end plates 25 by means of bolt 89 and nut 90, and a gasket 68 with hole 91 held by gasket retainer 70.

The hatch opening, under the hatch cover, is generally provided with a hatch coaming 26 about the perimeter thereof. We may secure, along the exterior of hatch coaming 26, and below the top thereof, coaming channel 27. Gasket seat plates 28 may be fastened to the top of coaming channel 27 running parallel to end plates 25 of the hatch cover. Rider plates 29 may be fastened to the top of those lengths of coaming channel 27 running parallel to side plates 23 of the hatch cover. The tops of gasket seat plates 28 and of rider plates 29 are at a uniform level.

It is the usual practice to run rails along two parallel sides of the hatch cover, and wheels are generally mounted to the hatch cover to roll on these rails. For the purpose of illustration, we show rails 119 secured to rider plates 29 so as to run parallel to side plates 23 of the hatch cover, it being understood that the hatch cover is hingedly mounted, adjacent end plates 25, in conventional fashion to the deck or hatch coaming.

It should be further understood that the embodiment of our dogging means shown in Figs. 1–5 as adjacent side plates 23 of the hatch cover may also be employed adjacent the end plates 25 of said hatch cover, and the embodiment of our dogging means shown in Figs. 6 and 7 as adjacent the end plates 25 of the hatch cover may also be employed adjacent side plates 23 of said hatch cover.

We will now describe in detail that embodiment of our invention as shown in Figs. 1–5.

Figure 3:
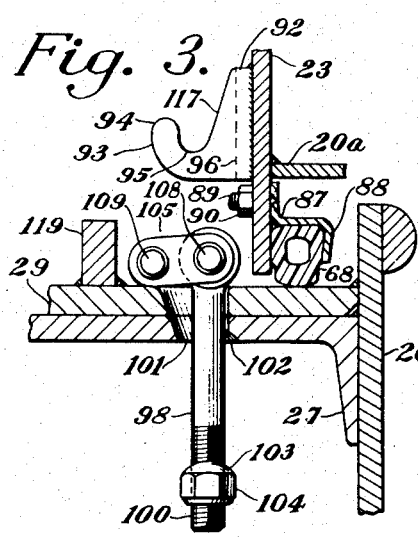
Fig. 3 represents still another view of the dogging means, as it appears when the hatch cover is undogged, showing the dog bolt suspended from the coaming channel and rider plate by the dog link.
Figure 4:
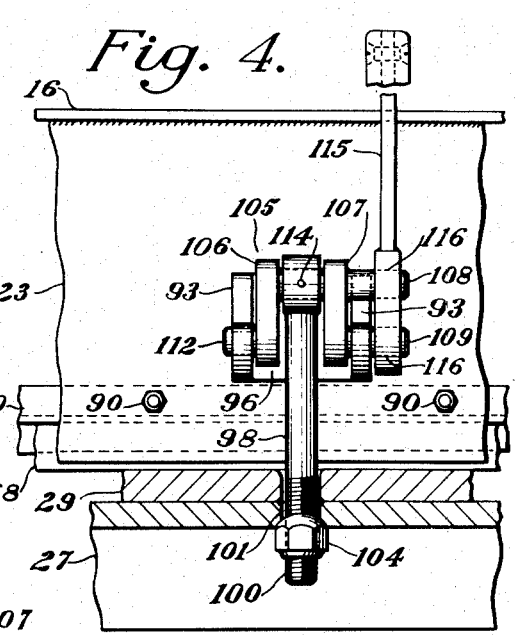
Fig. 4 represents a view in elevation of the dogging means, taken along the line 4—4 of Fig. 2.
Figure 5:
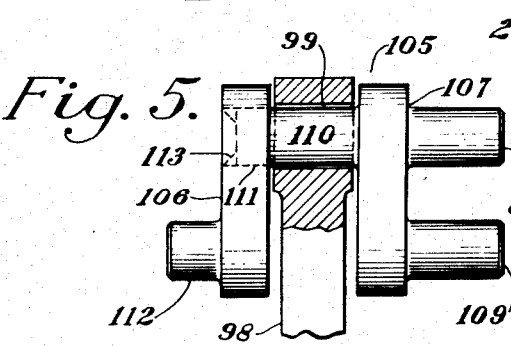
Fig. 5 represents a detail of the manner of assembly of the dog bolt and the dog link.

Holding means for the dog bolt 98 of the dogging apparatus comprises dog pad 92, with arms 93 forming shoulders 94, recesses 95 and slot 96. Dog pad 92 is fastened, as by welding, to the exterior of the side of the hatch cover as represented by side plate 23. Chock 97 is fastened, as by welding, to cover plate 16 and side plate 23, but may be omitted where dog pad 92 is adjacent a hatch cover girder (the latter not being shown, but known and conventionally used in the art to stiffen the hatch cover). Dog bolt 98, having eye 99 at the upper end, and threaded at the lower end, as at 100, is situated in slot 101. Slot 101, formed through coaming channel 27 and rider plate 29 (the latter elements functioning as restraining means for dog bolt 98), is trapezoidal in cross-section so as to permit rotation of dog bolt 98 in a plane perpendicular to hatch coaming 26. In addition, a concave bearing surface 102 is formed at the bottom of slot 101, and matches the convex bearing surface 103 of dog nut 104 which is threaded on dog bolt 98. Dog link 105 comprises female link 106 and male link 107. Male link 107 is formed with upper lever pin 108 and lower lever pin 109, both pins extending from one face of male link 107, and one bolt pin 110 extending from the opposite face thereof, and in axial alignment with upper lever pin 108. Female link 106 is formed with eye 111 and pin 112. To assemble dog link 105, bolt pin 110 of male link 107 is passed through eye 99 of dog bolt 98 thus rotatably mounting said dog bolt 98, and is inserted into eye 111 of female link 106 from that face of female link 106 opposite pin 112. The center-to-center distance between upper lever pin 108 and lower lever pin 109 on male link 107 is equal to the center-to-center distance between eye 111 and pin 112 on female link 106. Therefore, after bolt pin 110 is inserted in eye 111, female link 106 can be rotated until pin 112 is in axial alignment with lower lever pin 109. At this point, female link 106 can be permanently fastened to male link 107 by welding as at 113. It is very important that pin 112 be exactly aligned with lower lever pin 109 before the welding is done, as the dogging means will not work efficiently otherwise. Hole 114 for a grease fitting is drilled radially to eye 99 of dog bolt 98 to permit proper lubrication. When the hatch opening is uncovered, and dogging means is not in use, dog bolt 98 is suspended through slot 101 in rider plate 29 by dog link 105 (Figure 3).

When it is desired to actuate the dogging means, dog lever 115, formed with eyes 116 having a center-to-center distance equal to the center-to-center distance between upper lever pin 108 and lower lever pin 109 is employed. Upper lever pin 108 and lower lever pin 109 are of sufficient length to accommodate the thickness of one arm 93 of dog pad 92 and the thickness of dog lever 115. Arms 93 of dog pad 92 are spaced sufficiently to accommodate female link 106, male link 107, and dog bolt 98 in slot 96. Dog link 105 and dog bolt 98 are lifted from the suspended position, and pin 112 and lower lever pin 109 are brought over shoulders 94 of dog pad 92 and dropped into recesses 95 formed by arms 93 of said dog pad 92. Dog lever 115, with eyes 116 therein receiving upper lever pin 108 and lower lever pin 109, is pulled up as shown in Fig. 1, forcing the convex bearing surface 103 of dog nut 104 against the concave bearing surface 102 of slot 101, thus exerting a downward force on dog pad 92 and compressing gasket 68 against rider plate 29. The line joining the centers of eyes 116 of dog lever 115 is at an angle with the longitudinal axis of dog lever 115. Preferably, this angle is equal to the angle defined by the back of slot 96 and the line joining the centers of upper lever pin 108 and lower lever pin 109, said angles being calculated for the condition in which the upper end of dog bolt 98 is in contact with the back of said slot 96. Arms 93 of dog pad 92 are sloped as at 117. It will be noted that dog lever 115 is so mounted to dog link 105 that the line joining the centers of eyes 116 therein lies between the longitudinal axis of dog lever 115 and the hatch opening. The reason for this will now appear. As dog lever 115 is pulled up, it approaches a position parallel to hatch coaming 26. At this point, dog bolt 98 is locked into position against the back of slot 96 (Figure 2) and dog lever 115 can now be removed from upper lever pin 108 and lower lever pin 109 of dog link 105.

When it is desired to undog the hatch cover, the above process is simply reversed.

In that embodiment of our invention as shown in Figs. 6 and 7, we have substituted dog bolt 216 for dog bolt 98. Dog bolt 216 has eye 99 formed at the upper end, and is situated in slot 101 formed through coaming channel 27 and gasket seat plate 28. Dog bolt 216 is threaded at its lower end, as at 217, and nut 218 is threaded thereon holding washer 218a and maintaining pressure on spring 219 which, in turn, forces cap 220 having convex bearing surface 221 against concave bearing surface 103 of slot 101. After dog bolt 216 is assembled with cap 220, spring 219, nut 218, and washer 218a, the lower end of dog bolt 216 is peened, as at 222. This embodiment of our invention is operated in the same manner as the previously described embodiment, using the same dog link 105, dog pad 92, and dog lever 115. Spring 219 permits uniform gasket compression and uniform bolt stress.

Although we have shown and described our invention in considerable detail, we do not wish to be limited to the exact construction shown and described, but may use such substitutions, modifications or equivalents thereof, as are embraced within the scope of our invention, or as pointed out in the claims.

We claim:

1. In a hatch cover, dogging means comprising a dog bolt, resilient means mounted on said dog bolt, means on said dog bolt securing said resilient means to said dog bolt, said resilient means being adapted to urge said dog bolt in one direction when said dog bolt is in dogging position, restraining means having a first side and a second side and adapted to limit movement of said dog bolt along its longitudinal axis, a dog link rotatably mounted on said dog bolt in engageable relation with the first side of said restraining means when said dog bolt is in undogging position, a major portion of the length of said dog bolt being disposed by the second side of said restraining means when said dog bolt is in undogging position, holding means adapted to receive said dog link, and means adapted to rotate said dog link in said holding means eccentric to the axis of rotation of said dog link about said dog bolt.

2. In a hatch cover, dogging means comprising a dog bolt, resilient means mounted on said dog bolt, means on said dog bolt securing said resilient means to said dog bolt, said resilient means being adapted to urge said dog bolt in one direction when said dog bolt is in dogging position, restraining means having a first side and a second side and adapted to limit movement of said dog bolt along its longitudinal axis, a dog link rotatably mounted on said dog bolt in engageable relation with the first side of said restraining means when said dog bolt is in undogging position, a major portion of the length of said dog bolt being disposed by the second side of said restraining means when said dog bolt is in undogging position, holding means adapted to receive said dog link, and means adapted to rotate said dog link in said holding means about an axis of rotation intermediate said restraining means and the axis of rotation of said dog link about said dog bolt.

3. Dogging means for securing a hatch cover against a coaming, comprising a slotted laterally projecting flange secured to said coaming, a dog bolt slidably mounted in said slot, stopping means mounted on the lower end of said dog bolt in engageable relationship with the bottom of said flange, a dog link rotatably mounted on the upper end of said dog bolt above said flange, and holding means secured to said hatch cover and adapted to rotatably receive said dog link.

4. Dogging means as set forth in claim 3, including resilient means positioned between said stopping means and the bottom of said flange.

5. Dogging means as set forth in claim 3, said holding means including spaced arms secured to said hatch cover, a shoulder and a recess formed by each of said spaced arms, said shoulders registering with each other, and said recesses registering with each other.

6. Dogging means as set forth in claim 5, including axially aligned pins extending from said dog link, said pins being adapted to be carried over said shoulders and dropped in said recesses, about which pins said dog link may be rotated in said recesses.

7. Dogging means as set forth in claim 6, said stopping means comprising a nut threadedly mounted on the lower end of said dog bolt below said flange, said dogging means further including a concave bearing surface formed at the bottom of said flange about the mouth of said slot, and a convex bearing surface formed at the upper end of said nut, said convex bearing surface being adapted to engage said concave bearing surface when said dog link is rotated in said recesses about said pins.

8. Dogging means as set forth in claim 6, said stopping means comprising a nut threadedly mounted on the lower end of said dog bolt below said flange, said dogging means further including a spring concentrically mounted on said dog bolt above said nut, a cap slidably mounted on said dog bolt above said spring, a concave bearing surface formed at the bottom of said flange about the mouth of said slot, and a convex bearing surface formed at the upper end of said cap, said convex bearing surface being adapted to engage said concave bearing surface when said dog link is rotated in said recesses about said pins.

9. Dogging means for securing a hatch cover against a coaming, comprising slotted restraining means having a first side and a second side and secured to said coaming, a dog bolt slidably mounted in said slot, stopping means mounted on said dog bolt, a curved bearing surface on said stopping means in engageable relation with the second side of said slotted restraining means, a dog link rotatably mounted on the portion of said dog bolt projecting from said first side of said slotted restraining means, and holding means secured to the hatch cover to receive said dog link, said dog link being engageable with the first side of said slotted restraining means when said dog bolt is in undogging position.

10. Dogging means for securing a hatch cover against a coaming, comprising slotted restraining means having a first side and a second side and secured to said coaming, a dog bolt slidably mounted in said slot, stopping means mounted on said dog bolt, a curved bearing surface on the second side of said slotted restraining means adjacent said slot and in engageable relation with said stopping means, a dog link rotatably mounted on the portion of said dog bolt projecting from said first side of said slotted restraining means, and holding means secured to the hatch cover to receive said dog link, said dog link being engageable with the first side of said slotted restraining means when said dog bolt is in undogging position.

11. Dogging means for securing a hatch cover against a coaming, comprising slotted restraining means having a first side and a second side and secured to said coaming, a first curved bearing surface formed on the second side of said slotted restraining means adjacent the slot, a dog bolt slidably mounted in said slot, stopping means mounted on said dog bolt, a second curved bearing surface on said stopping means in engageable relation with the first curved bearing surface, a dog link rotatably mounted on the portion of said dog bolt projecting from said first side of said slotted restraining means, and holding means secured to the hatch cover to receive said dog link, said dog link being engageable with the first side of said slotted restraining means when said dog bolt is in undogging position.

12. Dogging means for securing a hatch cover against a coaming, comprising slotted restraining means having a first side and a second side and secured to said coaming, a dog bolt slidably mounted in said slot, stopping means associated with said dog bolt and adjustable along part of the length of said dog bolt, said stopping means being in engageable relation with the second side of said slotted restraining means, a dog link rotatably mounted on the portion of said dog bolt projecting from said first side of said slotted restraining means, and holding means secured to the hatch cover to pivotally receive said dog link, said dog link being engageable with the first side of said slotted restraining means when said dog bolt is in undogging position.

13. Dogging means as in claim 12, further including a curved bearing surface formed on said stopping means, said curved bearing surface being in engageable relation with the second side of said slotted restraining means.

14. Dogging means as in claim 12, further including a curved bearing surface formed on the second side of said slotted restraining means, said curved bearing surface being in engageable relation with said stopping means.

15. Dogging means as in claim 12, further including a first curved bearing surface formed on the second side of said slotted restraining means adjacent said slot, and a second curved bearing surface formed on said stopping means, said second curved bearing surface being in engageable relation with said first curved bearing surface.

16. Dogging means for securing a hatch cover against a coaming, comprising slotted restraining means having a first side and a second side and secured to said coaming, a dog bolt slidably mounted in said slot, stopping means mounted on said dog bolt in engageable relation with the second side of said slotted restraining means, a dog link rotatably mounted on the portion of said dog bolt projecting from said first side of said slotted restraining means, and holding means secured to the hatch cover in receivable relation to said dog link, the slot in said slotted restraining means having walls diverging from the second side of said slotted restraining means, said dog link being engageable with the first side of said slotted restraining means when said dog bolt is in undogging position.

17. Dogging means as in claim 16, further including a curved bearing surface formed on said stopping means, said curved bearing surface being in engageable relation with the second side of said slotted restraining means.

18. Dogging means as in claim 16, further including a curved bearing surface formed on the second side of said restraining means, said curved bearing surface being in engageable relation with said stopping means.

19. Dogging means as in claim 16, further including a first curved bearing surface formed on the second side of said slotted restraining means adjacent said slot, and a second curved bearing surface formed on said stopping means, said second curved bearing surface being in engageable relation with said first curved bearing surface.

20. Dogging means for securing a hatch cover against a coaming, comprising a slotted laterally projecting flange secured to said coaming, a dog bolt slidably mounted in said slot, stopping means mounted on the lower end of said dog bolt in engageable relationship with the bottom of said flange, a dog link rotatably mounted on the upper end of said dog bolt above said flange, holding means secured to said hatch cover and adapted to rotatably receive said dog link, said holding means including spaced arms secured to said hatch cover, a shoulder and a recess formed by each of said spaced arms, said shoulders registering with each other and said recesses registering with each other, a first pin and a second pin in axial alignment and extending from two opposite sides of said dog link to be carried over said shoulders and dropped into said recesses, a third pin extending from one side of said dog link in spaced relation to said first pin, and lever means receiving said first and third pins to rotate said dog link in said arms.

21. In a hatch cover, dogging means comprising a dog bolt, restraining means to limit movement of said dog bolt along its longitudinal axis, a major portion of the length of said dog bolt being disposed on one side of said restraining means when said dog bolt is in undogging position, and being disposed on the other side of said restraining means when said dog bolt is in dogging position, a dog link rotatably mounted on said dog bolt, holding means to receive said dog link, and means to rotate said dog link in said holding means eccentric to the axis of rotation of said dog link about said dog bolt, said dog link lying substantially flat on one side of said restraining means when said dog bolt is in undogging position.

References Cited in the file of this patent

UNITED STATES PATENTS

| Number | Name | Date |
|---|---|---|
| 1,100,292 | Duryea | June 16, 1914 |
| 1,400,953 | Hennicke | Dec. 20, 1921 |
| 1,444,020 | Alborn | Feb. 6, 1923 |
| 1,678,025 | Toncray | July 24, 1928 |
| 1,915,192 | Malivert | June 20, 1933 |
| 2,583,053 | Kestner et al. | Jan. 22, 1952 |

FOREIGN PATENTS

| Number | Country | Date |
|---|---|---|
| 253,939 | Great Britain | Dec. 9, 1926 |

UNITED STATES PATENT OFFICE
CERTIFICATE OF CORRECTION

Patent No. 2,901,279                                      August 25, 1959

Donald Frederick MacNaught et al.

It is hereby certified that error appears in the printed specification of the above numbered patent requiring correction and that the said Letters Patent should read as corrected below.

Column 6, line 11, before "restraining" insert -- slotted --.

Signed and sealed this 23rd day of February 1960.

(SEAL)

Attest:

KARL H. AXLINE
Attesting Officer

ROBERT C. WATSON
Commissioner of Patents